United States Patent [19]

Black

[11] 3,807,817
[45] Apr. 30, 1974

[54] BEARING ASSEMBLY AND METHOD OF MAKING SAME
[75] Inventor: John W. Black, Prairieville, Barry, Mich.
[73] Assignee: Pemko-Kalamazoo, Inc., Kalamazoo, Mich.
[22] Filed: July 14, 1972
[21] Appl. No.: 272,049

[52] U.S. Cl. .............................................. 308/190
[51] Int. Cl. ........................................... F16c 33/00
[58] Field of Search ........................... 308/190, 191

[56] References Cited
UNITED STATES PATENTS
2,750,238  6/1956  Black, Jr. ........................... 308/190
2,955,884  10/1960  Marshall ............................ 308/190

*Primary Examiner*—Manuel A. Antonakas
*Assistant Examiner*—Frank Susko
*Attorney, Agent, or Firm*—Woodhams, Blanchard and Flynn

[57] ABSTRACT

A bearing assembly for a wheel having a substantially cylindrical and coaxial opening therethrough including cylindrical shell means slideably and snugly receivable into said opening and axially substantially coextensive with said wheel means adjacent said opening. Said shell means has a central portion of reduced diameter spaced from the opposite axial ends thereof to form annular recesses into which a pair of outer bearing races are snugly received. A cylindrical axle having a central portion of enlarged diameter is coaxially disposed within the central opening and spaced from the reduced portion of said shell. A pair of inner races are snugly sleeved upon the axle means snugly adjacent the opposite ends of the enlarged portion thereof, and radially aligned respectively with the outer races. A plurality of bearing balls are disposed between each pair of radially aligned races and the axle means is staked adjacent the remote sides of the inner races to firmly hold the inner races against said enlarged portion.

9 Claims, 5 Drawing Figures

PATENTED APR 30 1974 3,807,817

BEARING ASSEMBLY AND METHOD OF MAKING SAME

FIELD OF THE INVENTION

This invention relates in general to a bearing assembly, and, more particularly, to a type thereof adapted for a wheel and having an outer shell, which is accurately formed to minimize tolerances and in which the inner races are mounted upon an axle means so that both the inner and outer races are caused to firmly and accurately engage the bearing balls in a predetermined manner.

BACKGROUND OF THE INVENTION

Although a variety of ball bearings and ball bearing assemblies have been devised in the past for meeting limitless situations where friction must be minimized, a constant effort is being made to improve the effectiveness of such bearing assemblies while simultaneously lowering their cost. This is of particular importance where the bearings are manufactured in large quantities for a variety of purposes, such as in caster wheels, conveyor wheels, small truck wheels and in wheels for other vehicles of generally similar nature. Where the production of such bearing assemblies is on the order of several hundred or more per hour, it is apparent that even a small reduction in the unit cost of a bearing assembly will result in greater savings, both to the manufacturer of the bearing assemblies and to the users thereof. On the other hand, in view of the critical part played by such bearing assemblies in practically all of their usual locations of use, it is equally apparent that such cost reductions, if any, must be made without sacrificing quality.

It is well known that the life of a bearing, hence of the wheel upon which it is mounted, is materially affected by the amount of looseness or play in the bearing parts thereof. Thus, where bearing parts are assembled with an excess amount of initial play, the useful life of the bearing is shortened in a corresponding manner. That is, unnecessary runout, radial play or axial play in the bearing parts relative to each other, or in the bearing parts relative to the wheel which they support, will tend to induce or accelerate wear which merely increases the play. In a sense, this results from the fact that the loose parts have an opportunity to hammer each other during normal use of the wheel or other structure in which the loose bearing is used. This acceleration is deterioration of loose bearing assemblies is especially noticeable in situations of severe useage, such as in the wheels of casters.

Furthermore, it has been largely taken for granted that looseness or excess play had to be tolerated in return for low cost bearing constructions. Accordingly, it is not uncommon for certain users, such as owners of supermarket shopping carts, to accept bearing failures in a relatively short period of time, such as less than two years of normal operation.

In one particular test, an existing bearing construction was randomly selected and found to have average tolerances. This bearing construction was of a type widely in use on shopping carts. It was found this bearing assembly of an existing type became totally destructed during a test period in which there was no observable damage or wear on the bearing assembly which is the subject of this invention and which was exposed to identically the same treatment as the existing bearing structure.

Some of the shortcomings in existing bearing constructions or assemblies are shown to stem from the fact that existing parts are not made with the tolerances required for long useful life. For example, the bearing races may be too small so that they tend to move with respect to the seats in which they are located. Since the races are usually hardened, and seats are not, wear will start to show on these oversized seats almost at once. Where spacers are used between pairs of bearings, nonparallelism in the planes of rotation or eccentricities readily develop. In order to avoid a seizing between the bearings and the axle, it is necessary in these situations to furnish slightly oversized bearings on undersized axles. This results in premature wear followed by excessive play, shimmy and, finally, total breakdown.

The hub constructions of the wheels, in which the bearings are assembled, are often inaccurate, out of round or defective in some other way. Thus, the bearing assembly promptly reflects the defectiveness of the wheel into which it is mounted. Where two spaced bearings are employed to support a wheel upon an axle, attempts are often made to ream or counterbore the opposite ends of the wheel hub for more accurate and snug reception of the outer races therein. However, the two counterbores are often relatively eccentric and, just as often, produce shoulders which define nonparallel planes, thus resulting in the nonparallelism of the bearings which must abut such shoulders.

Accordingly, a principal object of the invention is to provide a bearing assembly for mounting a spindle coaxially within, rotatably with respect to, a conventional wheel structure.

A further object of the invention is to provide a bearing assembly, as aforesaid, which is particularly adaptable for use in the wheels of a caster or the like where the treatment received by the bearing assembly, even under normal conditions of use, is severe by any reasonable standard.

A further object of the invention is to provide a bearing assembly, as aforesaid, having at least two bearings arranged around the axle or shaft, said bearings being spaced axially of said shaft from each other.

A further object of the present invention is to provide a bearing assembly, as aforesaid, of sufficient structural simplicity that it can be assembled rapidly, accurately and inexpensively.

A further object of the invention is to provide a bearing assembly, as aforesaid, comprised of a minimum number of parts, each part being of such structural configuration that it is capable of being assembled so that the strength of the assembly is increased during the assembly.

A further object of the invention is to provide a bearing structure, as aforesaid, in which the bearing can be constructed in a variety of sizes and for a variety of specific uses, with a minimum of modifications and structural limitations.

Other objects and purposes of the invention will be apparent to persons acquainted with bearing structures of this general type upon reading the following specification and inspecting the accompanying drawing, in which.

The words "in" and "out", used herein for convenience in reference, will refer to directions toward and away from, respectively, the geometric center of the device and designated parts thereof. Such terminology will include the words above specifically mentioned, derivatives thereof and words of similar import.

SUMMARY OF THE INVENTION

In general, the objects and purposes of the invention are met by providing a bearing assembly for a wheel having a central coaxial opening therethrough. The assembly includes a cylindrical plastic sleeve disposed within the opening in the wheel. The sleeve has a concentric opening therethrough with a central portion of reduced diameter. Two outer bearing races are snugly disposed within the sleeve adjacent the opposite ends of the reduced portion of the sleeve. An axle, having a central portion of enlarged outside diameter spaced from the opposite ends thereof, extends through the sleeve. Two inner bearing races are snugly disposed on the axle adjacent the opposite ends of the portion of enlarged diameter and are radially aligned respectively with the outer bearing races. Staked portions of the axle hold the inner races against movement away from each other, and bearing balls are disposed between the inner and outer races.

DETAILED DESCRIPTION

Figure 1:
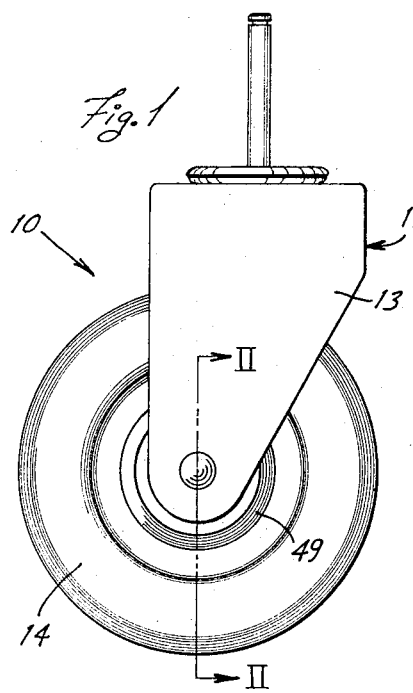
FIG. 1 is a side elevational view of a complete caster embodying the invention.

FIG. 1 illustrates a swivel caster 10, which includes an inverted, U-shaped frame 11 having a pair of parallel legs 12 and 13 (FIG. 2) straddling a wheel 14 and a bearing assembly 17 mounted in the central opening 16 of the wheel. An axle 20 extends through the bearing assembly 17 and through a pair of axially aligned openings 18 and 19 in the legs 12 and 13, respectively, of the frame 11.

Figure 4:
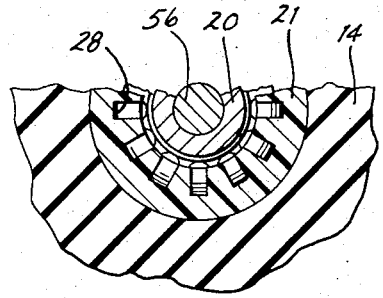
FIG. 4 is a sectional view taken along the line IV—IV in FIG. 2.

The bearing assembly 17 includes a hollow, thermoplastic sleeve 21 which is mounted in the opening 16. The opposite axial ends of the plastic sleeve 21 have radially extending flanges 22 and 23 which overlap the radially inner edges of the axial ends of the wheel to prevent relative axial movement between the sleeve 21 and the wheel 14. A pair of annular recesses 24 and 26 are provided in the inner edges of the opposite ends of the sleeve 21 and define between them a central portion 27 of reduced internal diameter. The sleeve 21 has a plurality of axially extending grooves 28 (FIG. 4) which, in this embodiment, are uniformly and closely spaced. The grooves 28 help to dissipate heat and they also reduce the amount of plastic material required to produce the sleeve 21.

Figure 2:
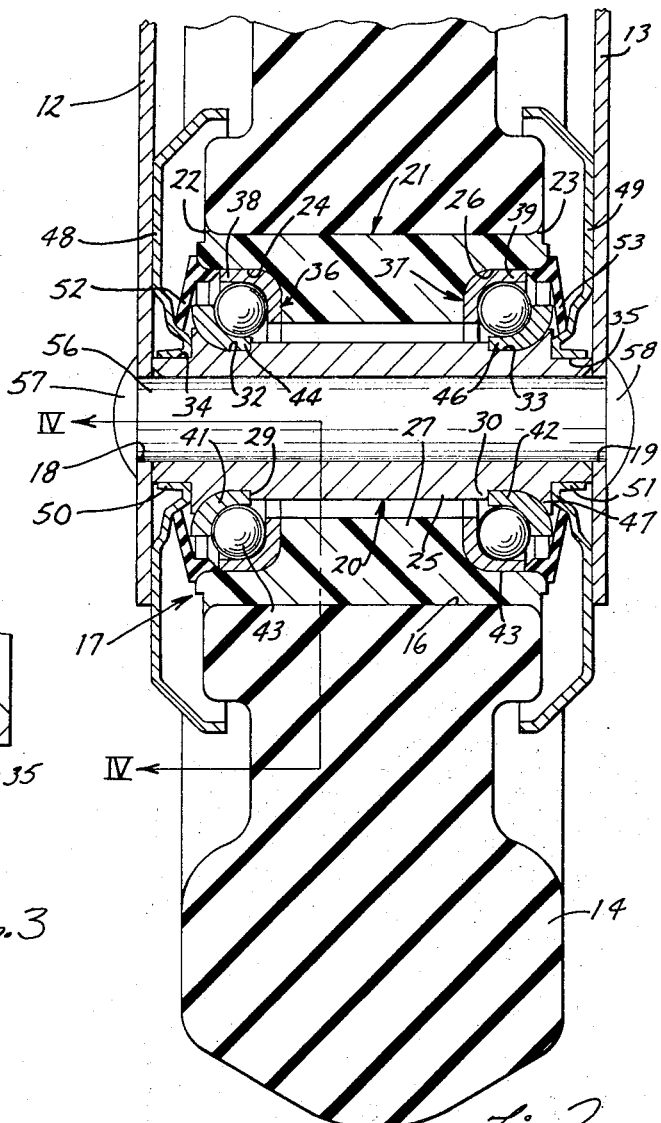
FIG. 2 is a cross sectional view taken along the line II—II in FIG. 1.

The axle 20 has a central opening 31 therethrough and it is mounted within the hollow sleeve 21. Said axle 20 has a central portion 25 of enlarged diameter which provides shoulders 29 and 30 at the opposite ends thereof, as illustrated in FIG. 2. The enlarged portion 25 of the axle 20 is spaced radially inwardly from the reduced portion 27 of the sleeve 21. The axial ends of the axle 20 each have two different reduced diameters 32, 33 and 34, 35 prior to the assembly of the bearings 36 and 37.

The bearings 36 and 37 have outer races 38, 39 and inner races 41, 42, respectively, with a plurality of bearing balls 43 therebetween. The outer races 38 and 39 are mounted in the annular recesses 24 and 26 in the sleeve 21. The inner races 41 and 42 are mounted on the reduced diameter portions 32 and 33, respectively, of the axle 20 snugly adjacent the shoulders 29 and 30. The annular recesses 24 and 26 are shaped so that the outer races fit the contours thereof. The axially inner annular edges 44 and 46 of the inner races are preferably tapered slightly during the forming process thereof and the portions 32 and 33 of axle 20 are slightly converging away from each other, so that the outer axial ends of the portions 32 and 33 are at a lesser diameter prior to assembly than the inner ends adjacent the shoulders 29 and 30.

The internal diameters of the inner races are about equal to the external diameters of the remote ends of the reduced axle portions 32 and 33. Thus, as the inner races are moved toward the shoulders 29 and 30, the tapered edges 44 and 46 are urged radially outwardly to snugly entrap the bearing balls 43 without binding them.

Figure 3:
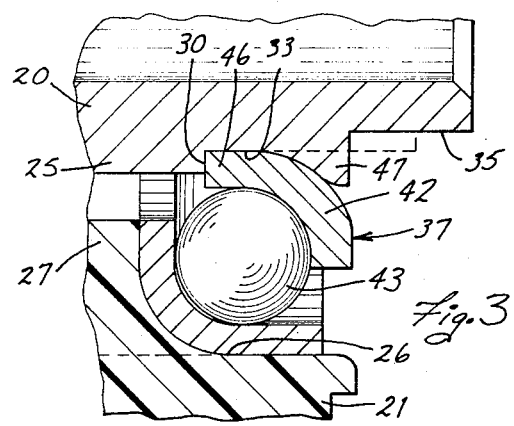
FIG. 3 is an enlarged fragment of FIG. 2.

The remote axial ends of the axle portions 32 and 33 are cold worked or staked toward each other to form annular, outwardly extending flanges, such as the flange 47 in FIG. 3, which snugly engage the axially outer sides of the races 41 and 42 whereby they are held against the shoulders 29 and 30, respectively.

The annular thread or dust shields 48 and 49 have integral, annular flanges 50 and 51, respectively, which are snugly sleeved on the reduced end portions 34 and 35 of the axle 20. The shields 48 and 49 may be made from metal or plastic.

Annular lubricant seals 52 and 53 are mounted upon the opposite ends of the sleeve 21 and extend radially inwardly therefrom for sliding engagement with the dust shields 48 and 49. Thus, the lubricant and dust shields cooperate to prevent the escape of lubricant from the bearings 36 and 37.

The bearing assembly 17, which includes the axle 20, the sleeve 21 and the bearings 36 and 37, is positioned along with the shields 48 and 49, and the lubricant seals 51 and 52, between the legs 12 and 13 of the frame 11 so that the opening 31 through the axle 20 is axially aligned with the openings 18 and 19 in the legs 12 and 13, respectively, of the frame 11. A shaft 56 is inserted through the aligned openings 18, 19 and 31 whereby the wheel 14 and bearing assembly 17 are mounted upon the legs 12 and 13 of the frame 11. The opposite ends 57 and 58 of the shaft 56 are staked, or otherwise enlarged in order to prevent removal of the shaft 56 from the frame 11.

ALTERNATE EMBODIMENT OF FIGURE 5

Figure 5:
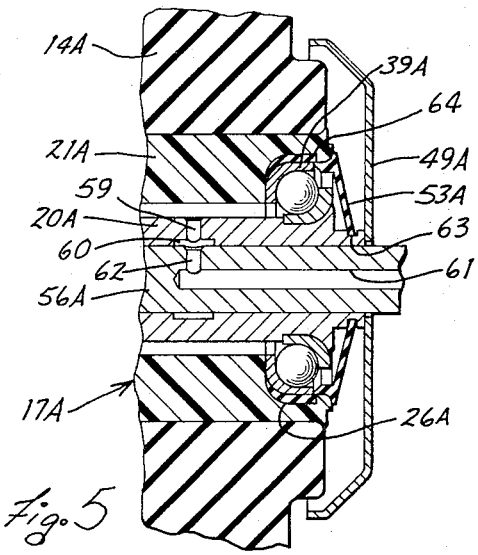
FIG. 5 is an enlarged fragment of FIG. 2 showing a modified bearing construction and mounting.

FIG. 5 illustrates an alternate bearing assembly 17A, and parts thereof, which correspond to parts of the bearing assembly 17, may be identified by the same numerals in addition to the suffix "A".

The axle 20A has a plurality of radial bores 59 which communicate at their inner ends with an annular groove 60 and at their outer ends with the space between the axle 20A and the sleeve 21A. The shafts 56A has an axial opening 61 which is connected with a radially extending passageway 62 communicating with the groove 60, hence with the bores 59. Lubricant, for example, can be supplied through the passageways 61, 62 and 59 to lubricate the bearings 36 and 37.

The axle 20A is further modified from the axle 20 by the fact that an annular groove 63 is provided in the reduced end portion 35A adjacent the end of the axle 20A to receive the inner edge of the annular lubricant seal 53A. A similar seal arrangement is provided at the other end of the axle 20A.

The sleeve 21A is modified by providing annular recesses, such as the recess 26A, which is radially enlarged to receive a resiliently flexible annulus 64 which acts as a shock absorbing device between the outer race 39A and the relatively rigid sleeve 21A.

The shield 49A is without a central flange, and it merely slides upon the opposite ends of shaft 56A.

ASSEMBLY

Although the operation of the bearing assemblies 17 and 17A, embodying the invention, will be apparent to skilled persons, the manner in which these structures are assembled will be summarized hereinbelow.

The outer races 38 and 39 are inserted into the annular recesses 24 and 26, respectively, and the axle 20 is inserted through the central opening of the sleeve 21. A plurality of of balls 43 are placed within the outer races 38 and 39 and, thereafter, the inner races 41 and 42 are mounted upon the reduced diameter portions 32 and 33, respectively, of the axle. Normally, the inner races 41 and 42 must be forcible urged along the converging surfaces of the portions 32 and 33, respectively, whereby they are firmly held in place by frictional engagement with the axle 20. The inner edge portions 44 and 46 of the races 41 and 42 are preferably tapered so that the radially outer surfaces thereof are about cylindrical. Thus, as the edge portions 44 and 46 move along the shaft portions 32 and 33, the radially outer surfaces of the edge portions 44 and 46 are moved outwardly into substantially cylindrical positions closely adjacent the bearing balls 43. The remote ends of the portions 32 and 33 of the axle 20 are staked to form the flanges 47 which prevent accidental disengagement of the inner races from the axle 20, thereby holding the bearing assembly together.

Said bearing assembly 17 can be quickly mounted upon a wheel 14 by inserting the sleeve 21 into the opening 16 of the wheel 14. The axial end portions of the sleeve are then flared radially outwardly, as by the application of heat, to form the flanges which snugly secure the sleeve within the opening 16 through the center of the wheel 14.

In the embodiment of FIG. 5, the resilient shock absorbent material 64 is inserted into the annular recess 26A prior to insertion of the outer race therein. Otherwise, the assembly operation is substantially the same.

TEST DATA

The bearing assembly disclosed above has been tested as part of a caster on a grocery cart under severe operating conditions. In one such test, referred to as the curb test, a cart is reciprocated horizontally along a supporting surface having an upwardly extending projection against which a wheel of said cart is intermittently and forcefully jammed. Thus, the wheel and its bearing assembly are exposed to severe radial impacts with each engagement between the wheel and the projection.

A similar test was conducted upon the castered wheel of a grocery cart having a bearing assembly of the type conventionally and widely used at the present time.

In another set of comparative tests, referred to as bump tests, the bearing assembly of the invention and the bearing assembly of the existing type were mounted in identical wheels which could be rotated freely but not pivoted or swiveled. These wheels were then rotated and, at the same time, the peripheral portions thereof were alternately urged first in one axial direction and then in the other at least once every second or so.

The dimensions listed in the following tables under the headings of Start "A," "B" and "C" and Stop "X," "Y" and "Z" represent amounts of movement existing in the bearing assemblies at the start of the test and at the end of the test. The dimensions "A" and "X" (FIG. 3) apply to axial movement, only. The dimensions "B" and "Y" (FIG. 2) apply to the amount of the deflection of the peripheral edge of the wheel 14 and, therefore, includes some axial movement, also. The dimensions "C" and "Z" (FIG. 2) apply to the amount of radial play, namely, the amount of relative radial movement between the axle 20 and the sleeve 21. These amounts of movement are all in inches.

TABLE I

CURB TEST — 5336 IMPACTS

| New Bearing | | Prior Art Bearing | |
|---|---|---|---|
| Start | Stop | Start | Stop |
| A = 0.012 | X = 0.020 | A = 0.015 | X = 0.062 |
| B = 0.025 | Y = 0.045 | B = 0.020 | Y = 0.187 |
| C = 0.012 | Z = 0.020 | C = 0.012 | Z = 0.062 |

TABLE II

BUMP TEST

| New Bearing 1,250,000 Impacts | | Prior Art Bearing 500,000 Impacts | |
|---|---|---|---|
| Start | Stop | Start | Stop |
| A = 0.012 | X = 0.036 | A = 0.015 | X = 0.092 |
| B = 0.025 | Y = 0.045 | B = 0.020 | Y = 0.275 |
| C = 0.012 | Z = 0.018 | C = 0.012 | Z = 0.132 |

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an enclusive property or privilege is claimed are defined as follows:

1. A bearing assembly for a means having a central coaxial opening therethrough, comprising:
   a cylindrical rigid sleeve snugly receivable into said central opening in said means, said sleeve having a portion of reduced inside diameter spaced from both axial ends thereof;
   a pair of outer bearing races snugly disposed within said sleeve against the opposite axial ends of said portion of reduced diameters;
   a hollow, cylindrical axle having spaced portions of reduced diameter defining spaced shoulders near the opposite ends thereof, said axle being disposed coaxially within and spaced from said reduced portion of said sleeve and extending axially beyond both ends thereof, said reduced diameter portions on said axle being slightly greater in diameter at the inner end of said shoulders and converging axially outwardly away therefrom;

a pair of inner bearing races snugly encircling said slightly converging portions of said reduced diameter adjacent said shoulders on said axle and radially aligned with said outer bearing races, the adjacent, annular edge portions of said pair of inner races being slightly tapered toward each other and snugly embracing said to slightly converging portions;

means on said axle positively holding said inner races against movement away from each other; and a plurality of bearing balls disposed between each pair of radially aligned inner and outer races, said slightly converging reduced diameter portions on said axle thereby effecting a snug entrapment of said bearing balls between said inner and outer races when said inner races are mounted to encircle said axle.

2. A bearing assembly for a wheel means having a central coaxial opening therethrough, comprising:

a cylindrical rigid sleeve snugly receivable into said central opening in said wheel means, the opposite ends of said opening through said wheel means diverging away from each other, said sleeve being formed from plastic material and the opposite ends thereof extending radially into said divergences in said wheel opening, said sleeve having a portion of reduced inside diameter spaced from both axial ends thereof;

a pair of outer bearing races snugly disposed within said sleeve against the opposite axial ends of said portion of reduced diameter;

a hollow, cylindrical axle having spaced portions of reduced diameter defining spaced shoulders near the opposite ends thereof, said axle being disposed coaxially within and spaced from said reduced portion of said sleeve and extending axially beyond both ends thereof;

a pair of inner bearing races snugly encircling said portions of said reduced diameter adjacent said shoulders and radially aligned with said outer bearing races, the adjacent, annular edge portions of said inner races being slightly tapered toward each other and snugly embracing said axle;

means on said axle positively holding said inner races against movement away from each other; and a plurality of bearing balls disposed between each pair of radially aligned inner and outer races.

3. A bearing assembly according to claim 2 wherein said inner and outer races have L-shaped cross sections one flange of each being substantially parallel with one flange of the other.

4. A bearing assembly according to claim 3 wherein portions of said axle adjacent the remote axial sides of said inner races are staked against said inner races and thereby provide said holding means.

5. A bearing assembly according to claim 2 including annular dust guards having flanged central openings in which the opposite axial ends of said axle are snugly received and held, said dust shields extending radially beyond said sleeve means and being axially spaced therefrom.

6. A bearing assembly according to claim 5 including a pair of annular lubricant retainers, the peripheral edge portions thereof being mounted on the opposite axial ends of said sleeve means, and the radially inner edges of said retainers being in sliding engagement with adjacent portions of said dust shields.

7. A bearing assembly according to claim 2 wherein said axle has at least one radial opening extending therethrough and an annular groove in the wall defining said central opening, said groove communicating with the inner end of said radial opening.

8. A bearing assembly for a means having a central coaxial opening therethrough, comprising:

a cylindrical rigid sleeve snugly receivable into said central opening in said means, said sleeve having a portion of reduced inside diameter spaced from both axial ends thereof, said reduced inside diameter portion having a plurality of spaced and inwardly opening grooves extending parallel with the axie thereof;

a pair of outer bearing races snugly disposed within said sleeve against the opposite axial ends of said portion of reduced diameter;

a hollow, cylindrical axle having spaced portions of reduced diameter defining spaced shoulders near the opposite ends thereof, said axle being disposed coaxially within and spaced from said reduced portion of said sleeve and extending axially beyond both ends thereof;

a pair of inner bearing races snugly encircling said portions of said reduced diameter adjacent said shoulders and radially aligned with said outer bearing races, the adjacent, annular edge portions of said inner races being slightly tapered toward each other and snugly embracing said axle;

means on said axle positively holding said inner races against movement away from each other; and a plurality of bearing balls disposed between each pair of radially aligned inner and outer races.

9. A bearing assembly according to claim 8 wherein said grooves in said reduced portion are uniformly spaced.

* * * * *